(12) United States Patent
Sawai et al.

(10) Patent No.: US 12,247,700 B2
(45) Date of Patent: Mar. 11, 2025

(54) HYDROGEN FILLING METHOD

(71) Applicant: TOYOTA JIDOSHA KABUSHIKI KAISHA, Toyota (JP)

(72) Inventors: Osamu Sawai, Okazaki (JP); Chiaki Kataoka, Nagakute (JP); Koji Sugiura, Toyota (JP); Tomoki Nakashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/315,277

(22) Filed: May 10, 2023

(65) Prior Publication Data

US 2024/0035623 A1 Feb. 1, 2024

(30) Foreign Application Priority Data

Jul. 29, 2022 (JP) ................... 2022-121365

(51) Int. Cl.
*F17C 13/02* (2006.01)
*F17C 5/06* (2006.01)

(52) U.S. Cl.
CPC ............ *F17C 13/026* (2013.01); *F17C 5/06* (2013.01); *F17C 2221/012* (2013.01); *F17C 2250/0439* (2013.01)

(58) Field of Classification Search
CPC .... F17C 13/026; F17C 5/06; F17C 2221/012; F17C 2250/0439
See application file for complete search history.

(56) References Cited

U.S. PATENT DOCUMENTS

| 2012/0125480 | A1* | 5/2012 | Inagi | F17C 5/06 141/82 |
| 2014/0290790 | A1* | 10/2014 | Mathison | F17C 5/007 141/94 |
| 2016/0223510 | A1* | 8/2016 | Carteau | G01N 33/22 |

FOREIGN PATENT DOCUMENTS

| DE | 0908665 | A2 * | 4/1999 |
| JP | 2011033069 | A | 2/2011 |
| WO | 2011012939 | A1 | 2/2011 |

OTHER PUBLICATIONS

Translation of EP 0908665 (Year: 1999).*

* cited by examiner

*Primary Examiner* — Jason K Niesz
(74) *Attorney, Agent, or Firm* — Hunton Andrews Kurth LLP

(57) ABSTRACT

A method of filling a tank with hydrogen includes: a step of attaching a filling tank to a filling device; and a step of controlling hydrogen filling from the filling device to the filling tank based on a temperature sensor provided in a dummy tank.

4 Claims, 3 Drawing Sheets

HYDROGEN FILLING METHOD

CROSS-REFERENCE TO RELATED APPLICATION

This application claims priority to Japanese Patent Application No. 2022-121365 filed on Jul. 29, 2022, incorporated herein by reference in its entirety.

BACKGROUND

1. Technical Field

The present disclosure relates to a method of filling a hydrogen tank with hydrogen.

2. Description of Related Art

Japanese Unexamined Patent Application Publication No. 2011-33069 (JP 2011-33069 A) discloses a method of filling a high-pressure tank with hydrogen.

SUMMARY

Cartridge-type hydrogen tanks need to be small in size because portability is important. A sufficient amount of hydrogen can be obtained by measuring the temperature inside the tank, but it is desirable that the cartridge-type hydrogen tank does not have a temperature sensor due to the need to keep it small and to reduce costs.

In view of the above problem, an object of the present disclosure is to provide a hydrogen filling method that enables appropriate hydrogen filling without installing a temperature sensor in a hydrogen tank (filling tank) that stores hydrogen for hydrogen utilization.

The present application discloses a method of filling a tank with hydrogen. The method includes: a step of attaching a filling tank to a filling device; and a step of controlling hydrogen filling from the filling device to the filling tank based on a temperature sensor provided in a dummy tank.

A plurality of the filling tanks can be attached to the filling device, and a total hydrogen capacity of the filling tanks and the dummy tank can be equal to or more than a predetermined value.

After the hydrogen filling of the filling tank and the dummy tank is completed, the filling tank may be removed from the filling device, and after an unfilled filling tank is attached, hydrogen in the dummy tank may be transferred from the dummy tank to the unfilled filling tank.

The filling device can be provided in equipment (for example, a hydrogen station) for filling a vehicle with hydrogen, and filling the filling tank with hydrogen can be performed at a time when there is no schedule for filling the vehicle, based on a filling plan for the vehicle.

According to the present disclosure, it is possible to appropriately fill hydrogen into a filling tank that does not have a temperature sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Hydrogen Filling Device

Figure 1:
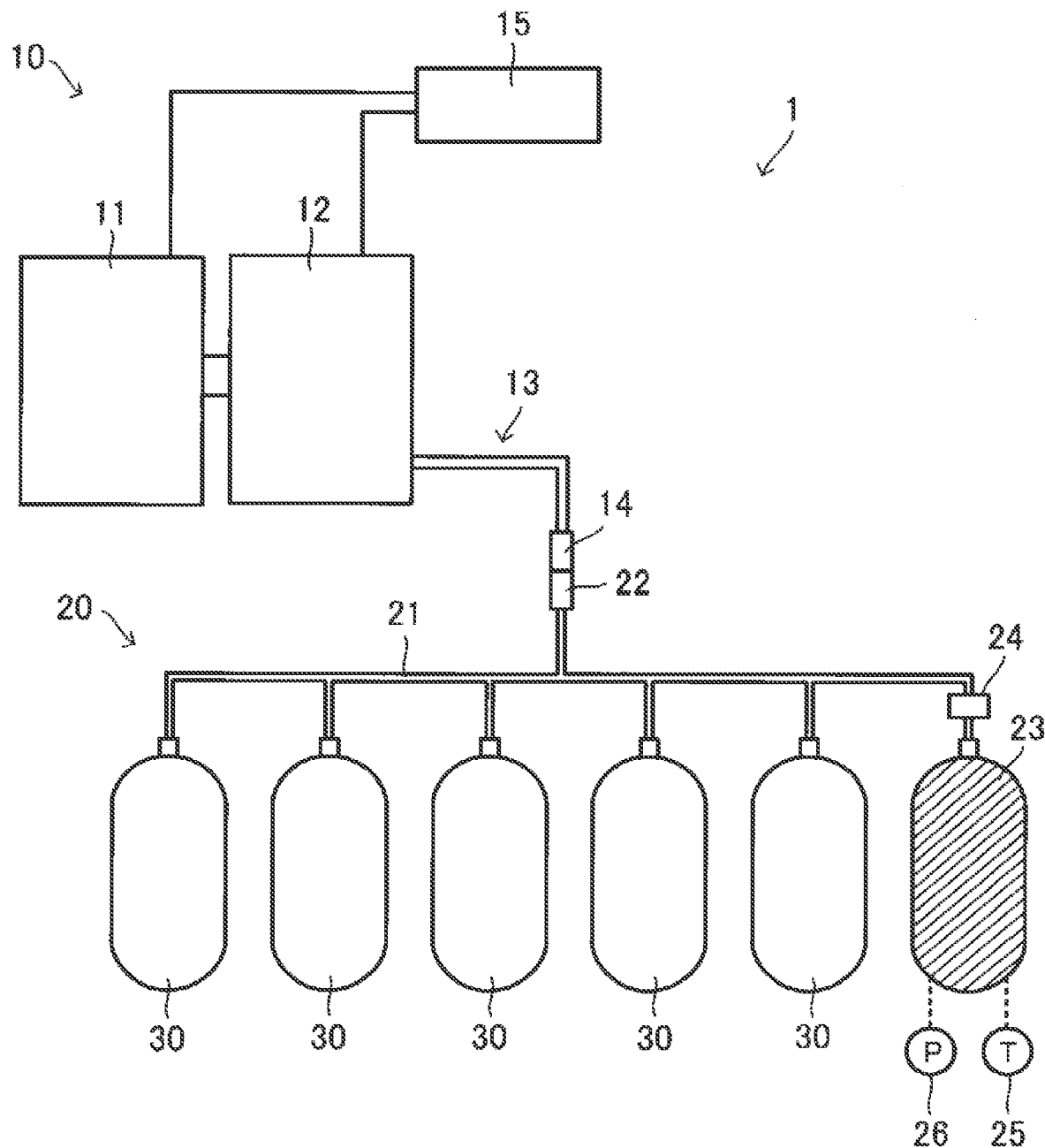
FIG. 1 is a schematic diagram of a hydrogen filling device 1 and filling tanks 30.

FIG. 1 shows a schematic diagram of a hydrogen filling device 1 that supplies hydrogen to filling tanks 30. In the present embodiment, the hydrogen filling device 1 has a dispenser 10 for ejecting stored hydrogen from a nozzle 14 and a distributor 20 connected to the dispenser 10 for distributing and supplying hydrogen to the filling tanks 30.

1.1. Dispenser

The dispenser 10 includes a pressure accumulator 11 filled with hydrogen, a compressor 12 that compresses (pressurizes) the hydrogen released from the pressure accumulator 11 into a pipe, a hydrogen supply pipe 13 that guides the pressurized hydrogen from the compressor 12 to the nozzle 14, the nozzle 14 provided at the tip of the hydrogen supply pipe 13, and a control device 15 that controls the hydrogen supply.

Hydrogen filling is performed by connecting the nozzle 14 to a device (receptacle) having a hydrogen filling port of a hydrogen supply target (the distributor 20 or a vehicle (not shown)). A known configuration can be applied to each configuration of the dispenser 10 described above.

1.2. Distributor

The distributor 20 is a device that distributes the hydrogen supplied from the dispenser 10 to the filling tanks 30. The distributor 20 in the present embodiment has a pipe 21, a receptacle 22, a dummy tank 23, an on-off valve 24, a temperature sensor 25, and a pressure sensor 26. Each part will be described below.

1.2.1. Pipe

The pipe 21 is a pipe forming a flow path through which hydrogen flows from the dispenser 10 to the filling tanks 30 and the dummy tank 23, and is a pipe branched from the dispenser 10 side to each tank. A connecting portion between the filling tank 30 and the pipe 21 and the dummy tank 23 and the pipe 21 is detachable, and is configured by a joint or the like.

The number of branches in the pipe 21 (the number to which the filling tank 30 can be connected) is not particularly limited. The number of branches can be determined so that the assumed total capacity is equal to or more than a predetermined value including the dummy tank 23. More details are as follows.

When the filling tank 30 is a cartridge-type filling tank (hydrogen tank with a capacity that allows portability), the size is small, and the hydrogen capacity is about 0.2 kg, for example. On the other hand, the hydrogen tank of a vehicle equipped with a fuel cell has a large hydrogen capacity, and it is assumed that the equipment (dispenser) that fills the hydrogen tank with hydrogen fills the hydrogen tank with a large hydrogen capacity. Therefore, one cartridge-type filling tank 30 cannot be filled with hydrogen from a dispenser that is assumed to fill a hydrogen tank with a large hydrogen capacity. By making it possible to connect a plurality of filling tanks 30 at the same time as in the present embodiment, it is possible to match the hydrogen filling capacity assumed by the dispenser, so that the dispenser for hydrogen filling for the vehicle can be applied to hydrogen filling for the filling tanks 30. For example, when the hydrogen capacity of the filling tank 30 is 0.2 kg and the assumed hydrogen capacity of the dispenser 10 is 2.0 kg, the piping branches may be provided so that a total of 10 tanks of the dummy tank 23 and the filling tanks 30 can be connected.

1.2.2. Receptacle

The receptacle 22 is a member disposed at the end of the pipe 21 on the dispenser 10 side to form a hydrogen filling port and to be detachably connected to the nozzle 14 of the dispenser 10. The specific form of the receptacle 22 is not particularly limited, and a known form can be used.

1.2.3. Dummy Tank

In the present embodiment, the dummy tank 23 is a hydrogen tank detachably connected to the pipe 21, and is a hydrogen tank used when filling the filling tank with hydrogen. The dummy tank 23 does not necessarily need to be removed from the pipe 21, and therefore does not have to be removable from the pipe.

The structure of the dummy tank 23 itself may be similar to that of a normal hydrogen tank, and its hydrogen capacity is preferably about the same as that of the filling tank 30, which is a hydrogen tank for hydrogen utilization. Therefore, the dummy tank 23 typically includes a tank body, which is a part for storing hydrogen, and a mouthpiece, which serves as an entrance and exit for hydrogen with respect to the tank body, to which the pipe 21 is connected.

The number of dummy tanks 23 is not particularly limited, and one or more may be disposed. For example, when the number of connectable filling tanks 30 is large, two or more dummy tanks may be provided. Also, the position of the dummy tank 23 is not particularly limited. However, from the viewpoint of simplifying the structure of the pipe, it is preferable to dispose the dummy tank at the endmost pipe branch.

1.2.4. On-Off Valve

The on-off valve 24 is an on-off valve disposed between the dummy tank 23 and the filling tanks 30 in the pipe 21, and allows hydrogen to flow into and out of the dummy tank 23 in the opened state, and regulates hydrogen to flow into and out of the dummy tank 23 in the closed state.

The mode of the on-off valve 24 is not particularly limited, and a known on-off valve can be used. The on-off valve may be manual or electric (electromagnetic valve). In the case of an electromagnetic valve, information can be received from the control device 15 of the dispenser 10, and the control device 15 can control the opening/closing state of the electromagnetic valve.

1.2.5. Temperature Sensor

The temperature sensor 25 is a sensor that measures the temperature inside the dummy tank 23. Therefore, the temperature sensor 25 is disposed in the dummy tank 23 and is capable of transmitting temperature information to the control device 15 of the dispenser 10, and the temperature information in the dummy tank 23 can be used by the control device 15 for hydrogen filling control.

The specific form of the temperature sensor 25 is not particularly limited, and a known form can be used.

By providing the dummy tank 23 with the temperature sensor 25 in this manner, the filling tank 30 can be appropriately filled with hydrogen without providing the filling tank 30 with a temperature sensor.

1.2.6. Pressure Sensor

The pressure sensor 26 is a sensor that measures the pressure in the distributor 20. In the present embodiment, the pressure sensor 26 is disposed in the dummy tank 23 and is capable of transmitting pressure information to the control device 15 of the dispenser 10, and the pressure information in the distributor 20 can be used by the control device 15 for hydrogen filling control. Although the pressure sensor 26 is disposed in the dummy tank 23 in the present embodiment, the location of the pressure sensor 26 is not limited to this, and the pressure sensor 26 may be disposed in the pipe 21. The specific form of the pressure sensor 26 is not particularly limited, and a known form can be used.

1.3. Installation of Hydrogen Filling Device

The hydrogen filling device 1 described above can be installed, for example, in a hydrogen station for filling a hydrogen tank of a vehicle equipped with a fuel cell with hydrogen. When the nozzle 14 of the dispenser 10 of the hydrogen filling device 1 is connected to the receptacle of the vehicle, the vehicle can be filled with hydrogen, and when the nozzle 14 is connected to the distributor 20, the filling tank 30 can be filled with hydrogen. According to this, it is not necessary to separately install a dispenser only for filling the filling tank 30 with hydrogen, so that the versatility of the equipment can be improved.

2. Filling Tank

The filling tank 30 is a container for storing hydrogen, and is a container for storing hydrogen for use in fuel cell power generation and the like. In the present embodiment, the filling tank 30 is a cartridge-type tank and has a smaller capacity than a hydrogen tank of a vehicle equipped with a fuel cell. For example, the hydrogen capacity of one filling tank 30 is 1.0 kg or less (about 0.2 kg).

The specific structure of the filling tank 30 is not particularly limited, and a known structure that can be used as a hydrogen tank can be applied. Typically, the filling tank 30 is provided with a tank body, which is a part for storing hydrogen, and a mouthpiece, which serves as an entrance and exit for hydrogen in the tank body and to which the pipe 21 is connected.

In the present embodiment, it is preferable that a plurality of filling tanks 30 is connected to the hydrogen filling device 1, and the number of tanks 30 is as described above regarding the branches of the pipe 21. Although the hydrogen filling capacities of the filling tanks 30 may differ, from the viewpoint of filling hydrogen based on the temperature information from the temperature sensor 25 of the dummy tank 23 as described later, it is preferable that the differences in the hydrogen filling capacities among the filling tanks 30 are small (differences of 0.05 kg or less) or that there are no differences.

3. Hydrogen Filling Control

3.1. Control Device

Figure 2:
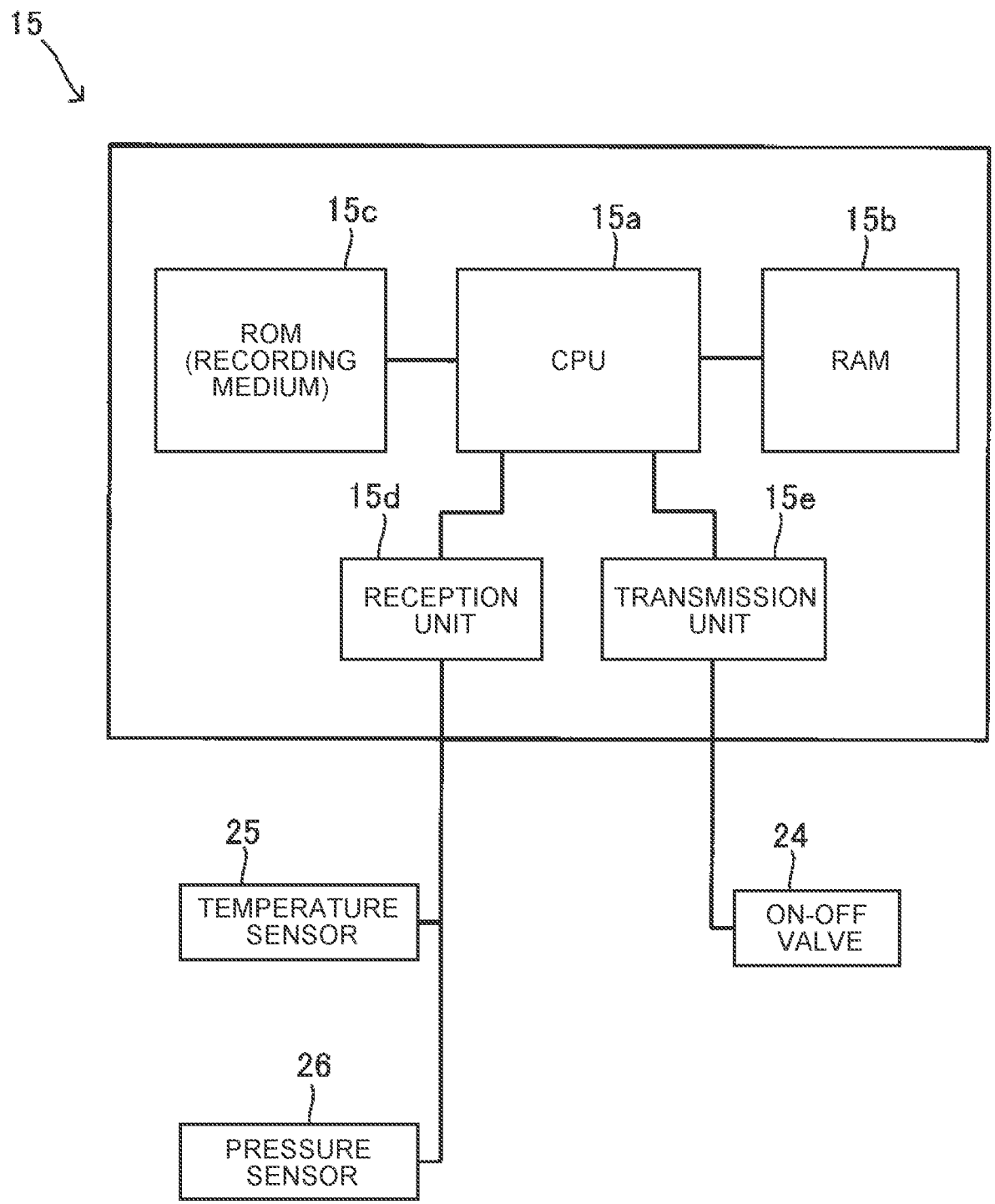
FIG. 2 is a diagram illustrating a configuration of a control device 15.

Although not particularly limited, hydrogen filling control may be performed by the control device 15. The control device 15 acquires whether the nozzle 14 is connected to the receptacle 22, the connection state of the filling tanks 30 (the number of the filling tanks 30, the total filling capacity, etc.), the temperature information from the temperature sensor 25, and the pressure information from the pressure sensor 26 to perform calculations, and controls, for example, the opening/closing of the on-off valve 24 and the start and stop of hydrogen filling. As conceptually shown in FIG. 2, the control device 15 includes a central processing unit (CPU) 15a that is a processor and performs calculations, a random access memory (RAM) 15b that functions as a work area, a read-only memory (ROM) 15c that functions as a recording medium, a reception unit 15d that is an interface for receiving information by the control device 15 regardless of wired or wireless communication, and a transmission unit 15e that is an interface for transmitting information from the control device 15 to the outside regardless of wired or wireless communication. Therefore, in the control device 15, the temperature sensor 25, the pressure sensor 26, various devices of the dispenser 10, and the like are connected to the reception unit 15d through which information is received, and the transmission unit 15e is connected to the on-off valve 24 and various devices of the dispenser 10 so as to be able to transmit a signal for opening/closing the on-off valve 24 and a signal for starting/stopping hydrogen filling.

The control device 15 stores a program that processes information from the temperature sensor 25, the pressure sensor 26, various devices of the dispenser 10, and the like, to determine and operate the opening/closing of the on-off valve 24, the start of hydrogen filling, and the stop of hydrogen filling. In the control device 15, the CPU 15a, the RAM 15b, and the ROM 15c as hardware resources cooperate with the program. Specifically, the CPU 15a executes a computer program recorded in the ROM 15c in the RAM 15b functioning as a work area, thereby realizing an appropriate hydrogen filling mode such as operating the on-off valve 24 and starting and stopping hydrogen filling. Information obtained or generated by the CPU 15a is stored in the RAM 15b. In addition, a separate recording medium may be provided inside or outside the control device 15, and programs and various data may be recorded therein.

Further, in the present embodiment, the control device 15 may store a schedule of hydrogen filling by the dispenser 10 as a database. The hydrogen filling schedule preferably includes the time for hydrogen filling for the vehicle, the scheduled amount of hydrogen, and the like. Information indicating that the filling tank 30 is scheduled to be filled with hydrogen at a time when the vehicle is not scheduled to be filled with hydrogen may be stored in the database. At this time, the total amount of hydrogen that can be supplied by the dispenser 10 may be compared with the total scheduled filling amount, and the control device can calculate a hydrogen supply plan giving priority so that the total amount of hydrogen that can be supplied does not exceed the total scheduled filling amount.

As a result, unevenness in the use of the dispenser can be suppressed, enabling leveling of hydrogen filling and hydrogen filling with good equipment usage efficiency.

The control device 15 as described above can typically be configured by a computer.

3.2. Hydrogen Filling Method

Figure 3:
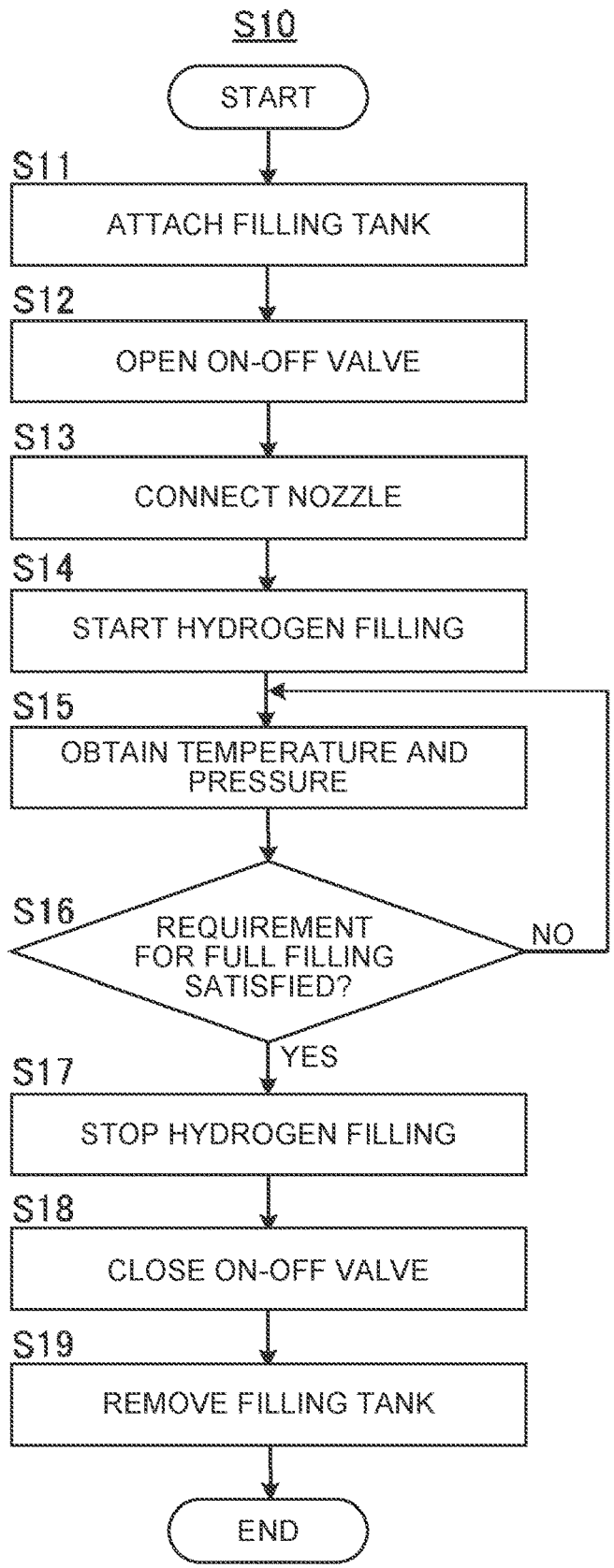
FIG. 3 is a diagram showing the flow of a hydrogen filling method S10.

FIG. 3 shows the flow of a hydrogen filling method S10 according to one example. As can be seen from FIG. 3, the hydrogen filling method S10 includes steps S11 to S19. Hereinafter, each step will be described. Here, as a state before step S11, the nozzle 14 of the dispenser 10 and the receptacle 22 of the distributor 20 are not connected, the filling tank 30 is not connected to the distributor 20, the dummy tank 23 is already filled with hydrogen and connected to the pipe, and the on-off valve 24 is closed.

3.2.1. Step S11

In step S11, the filling tank 30 not filled with hydrogen is connected (attached) to the pipe 21 of the distributor 20. Thus, hydrogen can be flowed (filled) into the filling tank 30 through the pipe 21.

3.2.2. Step S12

In step S12, the on-off valve 24 is opened. As a result, at least part of the hydrogen filled in the dummy tank 23 flows into and distributed to the filling tank 30. According to this, the hydrogen filled in the dummy tank 23 can be used without being discarded, so it is possible to suppress the generation of waste.

3.2.3. Step S13

In step S13, the nozzle 14 of the dispenser 10 and the receptacle 22 of the distributor 20 are connected. This secures a flow path for supplying hydrogen from the dispenser 10 to the filling tank 30 via the distributor 20.

3.2.4. Step S14

In step S14, filling of hydrogen from the dispenser 10 to the filling tank 30 is started. The start of filling of hydrogen may be automatically started by the calculation of the control device 15 when the connection is made in step S13, or may be started by a person operating a separately provided switch or the like.

3.2.5. Step S15

In step S15, the temperature value and the pressure value are obtained from the temperature sensor 25 and the pressure sensor 26 provided in the dummy tank 23, respectively. In the present embodiment, the obtained temperature and pressure values are received by the control device 15.

3.2.6. Step S16

In step S16, it is determined whether the filling tank 30 is full of hydrogen (a state in which sufficient hydrogen is filled with respect to the capacity) based on the temperature and pressure values acquired in step S15. As described above, in the present embodiment, since the filling state of the filling tank 30 can be obtained from the temperature detected by the temperature sensor 25 provided in the dummy tank 23, there is no need to provide the filling tank 30 with a temperature sensor.

The determination in step S16 in the present embodiment can be performed by the control device 15. Specifically, the control device 15 stores the relationship between the dummy tank internal temperature (and the pressure if necessary) and the hydrogen filling amount as a database, and the control device 15 uses this database for determination.

When it is determined in step S16 that the filling tank 30 is full, the determination result is Yes, and the process proceeds to step S17. On the other hand, when it is determined in step S16 that the filling tank 30 is not yet full, the determination result is No, the hydrogen filling is maintained, and the process returns to step S15 to obtain the temperature and pressure again.

3.2.7. Step S17

In step S17, hydrogen filling is stopped because it is determined in step S16 that the filling tank 30 is full. The control device 15 can determine to stop hydrogen filling and can perform the stop by issuing a command to the dispenser 10.

3.2.8. Step S18

In step S18, the on-off valve 24 is closed. As a result, the hydrogen filled in the dummy tank 23 can be maintained in the dummy tank 23, and when the on-off valve 24 is opened as in step S12 at the next opportunity, hydrogen can be distributed to the unfilled filling tank 30.

3.2.9. Step S19

In step S19, the filling tank 30 filled with hydrogen is removed from the pipe 21 of the distributor 20.

4. Effects etc.

According to the above embodiment, when filling the filling tank with hydrogen, the filling from the hydrogen filling device is controlled based on the temperature sensor provided in the dummy tank, so that the filling tank can be properly filled with hydrogen without providing the filling tank with the temperature sensor.

After the unfilled filling tank is attached to the hydrogen filling device, the hydrogen in the dummy tank filled at the previous opportunity can be distributed to the unfilled filling tank, so that the hydrogen stored in the dummy tank can be effectively used, which can reduce waste.

In addition, when multiple cartridge-type filling tanks (small-capacity hydrogen tanks) are installed in the hydrogen filling device and a capacity equal to or more than a predetermined amount is secured including the dummy tank, a dispenser assuming hydrogen filling in large-capacity hydrogen tanks as in fuel cell electric vehicles, etc. can be used, and the versatility of the device can be enhanced.

When the hydrogen filling device is provided in a hydrogen station for filling hydrogen into a fuel cell electric vehicle, the filling tank can be filled with hydrogen when the vehicle is not scheduled to be filled with hydrogen, based on the filling schedule. Thus, from the viewpoint of the use of hydrogen stations, gas charging can be leveled, and the utilization efficiency of the equipment can be improved.

What is claimed is:

1. A method of filling a tank with hydrogen, the method comprising:
    a step of attaching a filling tank to a filling device; and
    a step of controlling hydrogen filling from the filling device to the filling tank based on a temperature sensor provided in a dummy tank,
    wherein after the hydrogen filling of the filling tank and the dummy tank is completed, the filling tank is removed from the filling device, and after an unfilled filling tank is attached. hydrogen in the dummy tank is transferred from the dummy tank to the unfilled filling tank.

2. The method according to claim 1, wherein a plurality of the filling tanks is attached to the filling device, and a total hydrogen capacity of the filling tanks and the dummy tank is equal to or more than a predetermined value.

3. A method of filling a tank with hydrogen, the method comprising:
    a step of attaching a filling tank to a filling device; and
    a step of controlling hydrogen filling from the filling device to the filling tank based on a temperature sensor provided in a dummy tank,
    wherein the filling device is provided in equipment for filling a vehicle with hydrogen, and filling the filling tank with hydrogen is performed at a time when there is no schedule for filling the vehicle, based on a filling plan for the vehicle.

4. The method according to claim 3, wherein a plurality of the filling tanks is attached to the filling device, and a total hydrogen capacity of the filling tanks and the dummy tank is equal to or more than a predetermined value.

* * * * *